(12) United States Patent
Luo et al.

(10) Patent No.: US 10,590,273 B2
(45) Date of Patent: Mar. 17, 2020

(54) POLYARYLENE SULFIDE COMPOSITION

(71) Applicant: Ticona LLC, Florence, KY (US)

(72) Inventors: Rong Luo, Florence, KY (US); Xinyu Zhao, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 15/373,969

(22) Filed: Dec. 9, 2016

(65) Prior Publication Data
US 2017/0166748 A1 Jun. 15, 2017

Related U.S. Application Data

(60) Provisional application No. 62/266,222, filed on Dec. 11, 2015.

(51) Int. Cl.
C08L 81/04 (2006.01)
C08L 81/02 (2006.01)
(Continued)

(52) U.S. Cl.
CPC ............. *C08L 81/02* (2013.01); *A47G 19/26* (2013.01); *A47G 23/06* (2013.01); *B32B 7/04* (2013.01); *B32B 15/08* (2013.01); *B32B 15/18* (2013.01); *B32B 15/20* (2013.01); *B32B 19/00* (2013.01); *B32B 27/18* (2013.01); *B32B 27/20* (2013.01); *B32B 27/24* (2013.01); *B32B 27/281* (2013.01); *B32B 27/283* (2013.01); *B32B 27/285* (2013.01); *B32B 27/286* (2013.01); *B32B 27/288* (2013.01); *B32B 27/308* (2013.01); *B32B 27/32* (2013.01); *B32B 27/34* (2013.01); *B32B 27/36* (2013.01); *B32B 27/38* (2013.01); *B32B 2250/02* (2013.01); *B32B 2262/10* (2013.01); *B32B 2262/101* (2013.01); *B32B 2262/108* (2013.01); *B32B 2264/10* (2013.01); *B32B 2264/102* (2013.01); *B32B 2264/104* (2013.01); *B32B 2270/00* (2013.01); *B32B 2307/306* (2013.01); *B32B 2307/308* (2013.01); *B32B 2307/3065* (2013.01); *B32B 2307/4026* (2013.01); *B32B 2307/54* (2013.01);
(Continued)

(58) Field of Classification Search
CPC ....................................................... C08L 81/04
USPC ....................................................... 428/457
See application file for complete search history.

(56) References Cited

U.S. PATENT DOCUMENTS 4,418,029 A 11/1983 Reed et al.
4,708,983 A 11/1987 Liang
(Continued)

FOREIGN PATENT DOCUMENTS

CN 1718635 A 1/2006
CN 103554914 A 2/2014
(Continued)

OTHER PUBLICATIONS

Paper—Ryan et al., "Ultra High Molecular Weight Functional Siloxane Additives in Polymers: Effects on Processing and Properties," Dow Corning, 2001, 16 pages.
(Continued)

Primary Examiner — Duc Truong
(74) Attorney, Agent, or Firm — Dority & Manning, P.A.

(57) ABSTRACT

A polymer composition that comprises a polyarylene sulfide, inorganic fibers, an impact modifier, an organosilane compound, and a high molecular weight siloxane polymer is provided.

22 Claims, 2 Drawing Sheets

(51) Int. Cl.

| | |
|---|---|
| *B32B 27/28* | (2006.01) |
| *B32B 27/32* | (2006.01) |
| *B32B 15/20* | (2006.01) |
| *B32B 27/36* | (2006.01) |
| *B32B 27/30* | (2006.01) |
| *B32B 7/04* | (2019.01) |
| *B32B 27/20* | (2006.01) |
| *B32B 15/18* | (2006.01) |
| *B32B 27/18* | (2006.01) |
| *B32B 19/00* | (2006.01) |
| *B32B 27/24* | (2006.01) |
| *B32B 27/34* | (2006.01) |
| *B32B 27/38* | (2006.01) |
| *A47G 19/26* | (2006.01) |
| *A47G 23/06* | (2006.01) |
| *B32B 15/08* | (2006.01) |
| C08L 33/06 | (2006.01) |
| C08K 5/5415 | (2006.01) |
| C08L 63/10 | (2006.01) |
| A47G 19/00 | (2006.01) |
| C08K 5/54 | (2006.01) |

(52) U.S. Cl.
CPC ... *B32B 2307/546* (2013.01); *B32B 2307/558* (2013.01); *B32B 2307/704* (2013.01); *B32B 2307/714* (2013.01); *B32B 2307/7145* (2013.01); *B32B 2307/732* (2013.01); *B32B 2457/00* (2013.01); *B32B 2597/00* (2013.01); *B32B 2605/00* (2013.01); *C08L 2205/03* (2013.01); *C08L 2205/035* (2013.01); *C08L 2205/06* (2013.01)

(56) References Cited

U.S. PATENT DOCUMENTS

| | | | |
|---|---|---|---|
| 4,871,810 | A | 10/1989 | Saltman |
| 5,011,887 | A | 4/1991 | Sasaki et al. |
| 5,071,907 | A | 12/1991 | Nakata et al. |
| 5,157,070 | A | 10/1992 | Orikasa et al. |
| 5,191,020 | A | 3/1993 | Masamoto et al. |
| 5,219,920 | A | 6/1993 | Yamamoto et al. |
| 5,258,450 | A | 11/1993 | Nakata et al. |
| 5,270,375 | A | 12/1993 | Yamamoto et al. |
| 5,281,665 | A | 1/1994 | Fukui et al. |
| 5,288,798 | A | 2/1994 | Koshirai et al. |
| 5,288,817 | A | 2/1994 | Yamamoto et al. |
| 5,324,796 | A | 6/1994 | Han |
| 5,604,287 | A | 2/1997 | Yamao |
| 5,723,542 | A | 3/1998 | Hwang et al. |
| 6,072,012 | A | 6/2000 | Juen et al. |
| 6,166,137 | A | 12/2000 | Brown et al. |
| 6,608,136 | B1 | 8/2003 | Dean et al. |
| 6,699,946 | B1 | 3/2004 | Lambla et al. |
| 6,849,697 | B2 | 2/2005 | Lambla et al. |
| 6,960,628 | B2 | 11/2005 | Matsuoka et al. |
| 7,173,090 | B2 | 2/2007 | Akiyama et al. |
| 7,863,378 | B2 | 1/2011 | Nishihara et al. |
| 7,960,473 | B2 | 6/2011 | Kobayashi et al. |
| 8,324,308 | B2 | 12/2012 | Kinouchi |
| 8,663,764 | B2 | 3/2014 | Luo et al. |
| 8,703,029 | B2 | 4/2014 | Takada et al. |
| 8,779,051 | B2 | 7/2014 | Kisin et al. |
| 8,852,707 | B2 | 10/2014 | Nishikawa et al. |
| 8,975,305 | B2 | 3/2015 | Topolkaraev et al. |
| 9,074,096 | B2 | 7/2015 | Okubo et al. |
| 9,493,646 | B2 | 11/2016 | Luo et al. |
| 9,494,260 | B2 | 11/2016 | Luo et al. |
| 9,494,262 | B2 | 11/2016 | Luo et al. |
| 9,611,388 | B2 | 4/2017 | Watanabe et al. |
| 9,650,515 | B2 | 5/2017 | Kang et al. |
| 9,718,225 | B2 | 8/2017 | Luo et al. |
| 9,758,674 | B2 | 9/2017 | Luo et al. |
| 9,771,465 | B2 | 9/2017 | Ichinose et al. |
| 9,938,407 | B2 | 4/2018 | Unohara et al. |
| 2013/0035440 | A1 | 2/2013 | Nishikawa et al. |
| 2013/0269977 | A1 | 10/2013 | Luo et al. |
| 2014/0316041 | A1 | 10/2014 | Mehta |
| 2015/0064437 | A1* | 3/2015 | Luo .................. B29C 45/0001 428/220 |
| 2015/0197605 | A1 | 7/2015 | Lee et al. |
| 2015/0225547 | A1 | 8/2015 | Tu et al. |
| 2015/0225567 | A1 | 8/2015 | Miller et al. |
| 2017/0058124 | A1 | 3/2017 | Luo et al. |
| 2017/0059062 | A1 | 3/2017 | Luo et al. |
| 2017/0096557 | A1 | 4/2017 | Ohnishi et al. |
| 2017/0121525 | A1 | 5/2017 | Luo et al. |
| 2017/0166747 | A1 | 6/2017 | Tu et al. |
| 2017/0369705 | A1 | 12/2017 | Luo et al. |
| 2018/0015648 | A1 | 1/2018 | Luo et al. |

FOREIGN PATENT DOCUMENTS

| | | |
|---|---|---|
| CN | 103965642 A | 8/2014 |
| CN | 104672903 A | 6/2015 |
| DE | 4016059 A1 | 11/1991 |
| EP | 0 288 308 B1 | 4/1988 |
| EP | 0 389 905 A1 | 10/1990 |
| EP | 0 473 962 B1 | 8/1991 |
| EP | 0 480 426 A1 | 10/1991 |
| EP | 0 732 366 A2 | 9/1996 |
| EP | 3 252 106 A1 | 12/2007 |
| JP | S 6227459 | 2/1987 |
| JP | S 62268612 | 11/1987 |
| JP | S 63189457 | 8/1988 |
| JP | H 01240566 | 9/1989 |
| JP | H 02225565 | 9/1990 |
| JP | H 02286746 | 11/1990 |
| JP | H 03140368 | 6/1991 |
| JP | H 0472356 | 3/1992 |
| JP | H 059385 | 1/1993 |
| JP | H 06239972 | 8/1994 |
| JP | H 0753869 | 2/1995 |
| JP | H 08337719 | 12/1996 |
| JP | H 11130961 | 5/1999 |
| JP | H 11349813 | 12/1999 |
| JP | 2000001615 | 1/2000 |
| JP | 2000103963 | 4/2000 |
| JP | 2000186209 | 7/2000 |
| JP | 2004217895 A | 8/2004 |
| JP | 2006045390 | 2/2006 |
| JP | 2006328291 | 12/2006 |
| JP | 2008144002 | 6/2008 |
| JP | 2008260830 | 10/2008 |
| JP | 2010505025 | 2/2010 |
| JP | 2011016942 A | 1/2011 |
| JP | 2011026439 | 2/2011 |
| JP | 5339912 B2 | 11/2013 |
| JP | 2014177571 | 9/2014 |
| JP | 2014189573 | 10/2014 |
| JP | 2017066344 A | 4/2017 |
| JP | 2017066374 A | 4/2017 |
| JP | 2018053003 A | 4/2018 |
| JP | 2018053118 A | 4/2018 |
| JP | 2018162388 A | 10/2018 |
| WO | WO 94/16018 A1 | 7/1994 |
| WO | WO 2015/031232 A1 | 3/2015 |
| WO | WO 2015/064499 A1 | 5/2015 |
| WO | WO 2015/134860 A1 | 9/2015 |
| WO | WO 2017/010364 A1 | 1/2017 |
| WO | WO 2017/057558 A1 | 4/2017 |
| WO | WO 2017/057559 A1 | 4/2017 |

OTHER PUBLICATIONS

Product Information on Dow Corning® MB50-314, Masterbatch, from Dow Corning, 2001, 2 pages.
International Search Report and Written Opinion for PCT/US2016/065515 dated Feb. 15, 2017, 10 pages.

(56) References Cited

OTHER PUBLICATIONS

Supplementary European Search Report dated Jul. 16, 2019, 6 pages.

* cited by examiner

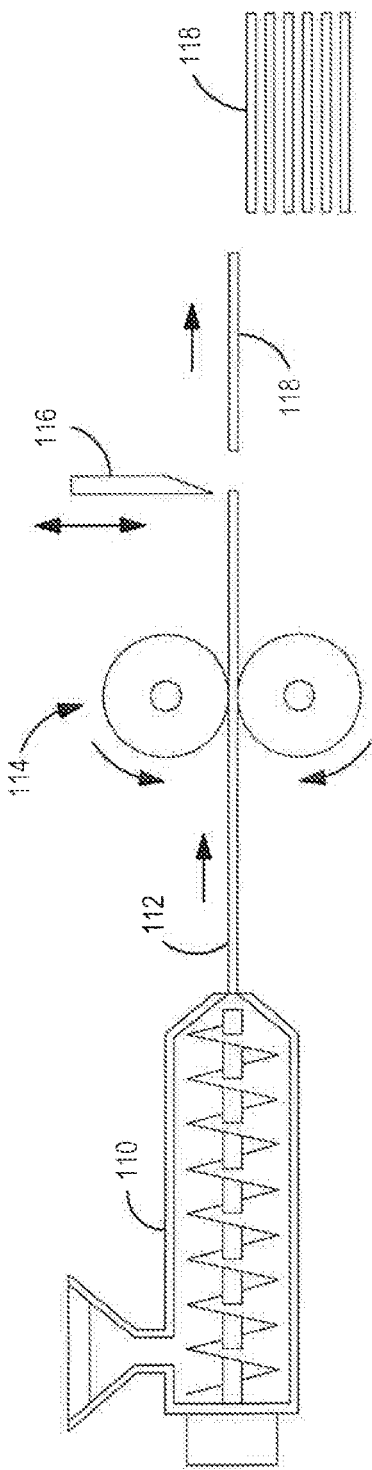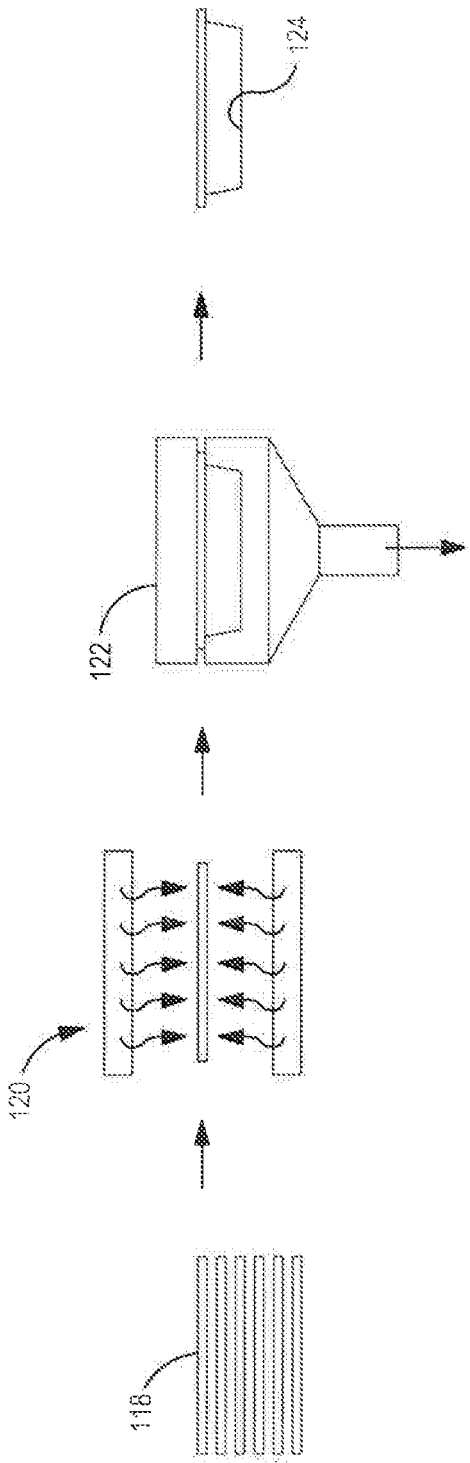

POLYARYLENE SULFIDE COMPOSITION

RELATED APPLICATION

The present application claims priority to U.S. Provisional Application Ser. No. 62/266,222, filed on Dec. 11, 2015, which is incorporated herein in its entirety by reference thereto.

BACKGROUND OF THE INVENTION

Polymeric materials are employed in a wide variety of different devices. As the demand for thinner devices has increased, so has the demand for higher performance plastic materials that can be molded into the desired configurations. One such material is polyphenylene sulfide ("PPS"), which is a high performance polymer that can withstand high thermal, chemical, and mechanical stresses. PPS is generally formed via polymerization of p-dichlorobenzene with an alkali metal sulfide or an alkali metal hydrosulfide, forming polymers that include chlorine at the terminal groups. In an effort to improve impact strength, impact modifiers (e.g., elastomeric polymers) are often blended with PPS compositions. Unfortunately, most impact modifiers are incompatible with PPS, which can lead to phase separation of the components over time and a corresponding reduction in mechanical performance. As such, a need currently exists for a polyarylene sulfide composition that is capable of exhibiting good impact strength without sacrificing other properties.

SUMMARY OF THE INVENTION

In accordance with one embodiment of the present invention, a polymer composition is disclosed that comprises a polyarylene sulfide, inorganic fibers, an impact modifier, an organosilane compound, and a high molecular weight siloxane polymer. In certain embodiments, a food tray may be formed in part or entirely from the polymer composition. For example, the food tray may contain a sidewall that extends upwardly from a lower wall to define a receptacle for one or more food products. The sidewall, lower wall, or a combination thereof may contain the polymer composition.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a side view of a process for forming a sheet, which may contain the polymer composition of the present invention;

FIG. 2 is a side view of a thermoforming process that may be employed in one embodiment of the present invention.

Figure 3:
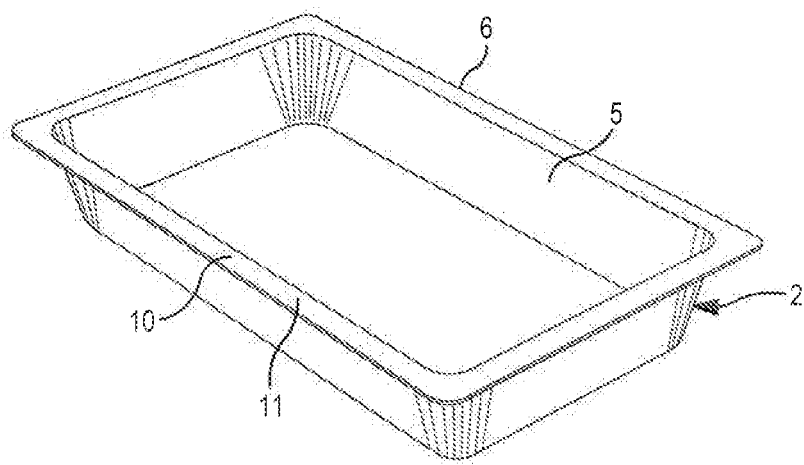
FIG. 3 is a perspective view of one embodiment of a shaped part that may be formed from the polymer composition of the present invention in the form of a food tray.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a polymer composition that includes a polyarylene sulfide in combination with a carefully controlled selection of components so as to achieve significantly improved mechanical properties (e.g., impact strength) and enhanced processability. For example, the polymer composition contains an organosilane compound in conjunction with an impact modifier and inorganic fibers (e.g., glass fibers). Without intending to be limited by theory, it is believed that the organosilane compound can undergo a reaction with the inorganic fibers and/or impact modifier, thereby allowing for reactive coupling of such components to the polyarylene sulfide and thus improved compatibility. The polymer composition also includes a siloxane polymer which, among other things, can improve processability (e.g., during molding). Without intending to be limited by theory, it is believed that certain types of siloxane polymers having a high weight average molecular weight (e.g., about 100,000 grams per mole or more) can reduce the tendency of the siloxane polymer to migrate to the surface of the composition, which even further minimizes the likelihood of phase separation and improves the mechanical properties of the resulting composition.

Various embodiments of the present invention will now be described in greater detail below.

I. Polymer Composition

A. Polyarylene Sulfide

Polyarylene sulfides typically constitute from about 25 wt. % to about 95 wt. %, in some embodiments from about 30 wt. % to about 80 wt. %, and in some embodiments, from about 40 wt. % to about 70 wt. % of the polymer composition. The polyarylene sulfide(s) employed in the composition generally have repeating units of the formula:

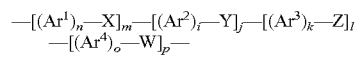

wherein,
Ar$^1$, Ar$^2$, Ar$^3$, and Ar$^4$ are independently arylene units of 6 to 18 carbon atoms;
W, X, Y, and Z are independently bivalent linking groups selected from —SO$_2$—, —S—, —SO—, —CO—, —O—, —C(O)O— or alkylene or alkylidene groups of 1 to 6 carbon atoms, wherein at least one of the linking groups is —S—; and
n, m, i, j, k, l, o, and p are independently 0, 1, 2, 3, or 4, subject to the proviso that their sum total is not less than 2.

The arylene units Ar$^1$, Ar$^2$, Ar$^3$, and Ar$^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihaloaromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

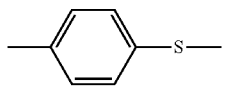

and segments having the structure of formula:

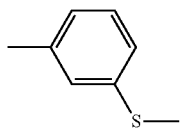

or segments having the structure of formula:

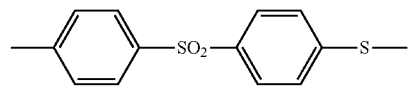

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

In one embodiment, the polyarylene sulfide may be an untreated polyarylene sulfide. In another embodiment, the polyarylene sulfide may be a treated polyarylene sulfide. For instance, the polyarylene sulfide may be heated in an oxygen atmosphere and/or in the presence of a cross-linking agent, such as a peroxide. By employing a treated polyarylene sulfide polymer, a color change of the polyarylene sulfide polymer composition can be obtained. For instance, the color of the composition can be changed by adjusting the ratio of the untreated polyarylene sulfide to the treated polyarylene sulfide. Color changes may also be achieved by employing cured or branched polyarylene sulfide in lieu of or in addition to the treated polyarylene sulfide.

B. Impact Modifier

Impact modifiers typically constitute from about 1 wt. % to about 40 wt. %, in some embodiments from about 2 wt. % to about 30 wt. %, and in some embodiments, from about 3 wt. % to about 25 wt. % of the polymer composition. Examples of suitable impact modifiers may include, for instance, polyepoxides, polyurethanes, polybutadiene, acrylonitrile-butadiene-styrene, polyamides, block copolymers (e.g., polyether-polyamide block copolymers), etc., as well as mixtures thereof. In one embodiment, an olefin copolymer is employed that is "epoxy-functionalized" in that it contains, on average, two or more epoxy functional groups per molecule. The copolymer generally contains an olefinic monomeric unit that is derived from one or more α-olefins.

Examples of such monomers include, for instance, linear and/or branched α-olefins having from 2 to 20 carbon atoms and typically from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin monomers are ethylene and propylene. The copolymer may also contain an epoxy-functional monomeric unit. One example of such a unit is an epoxy-functional (meth)acrylic monomeric component. As used herein, the term "(meth) acrylic" includes acrylic and methacrylic monomers, as well as salts or esters thereof, such as acrylate and methacrylate monomers. For example, suitable epoxy-functional (meth) acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate. Other suitable monomers may also be employed to help achieve the desired molecular weight.

Of course, the copolymer may also contain other monomeric units as is known in the art. For example, another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. In one particular embodiment, for example, the copolymer may be a terpolymer formed from an epoxy-functional (meth)acrylic monomeric component, α-olefin monomeric component, and non-epoxy functional (meth)acrylic monomeric component. The copolymer may, for instance, be poly(ethylene-co-butylacrylate-co-glycidyl methacrylate), which has the following structure:

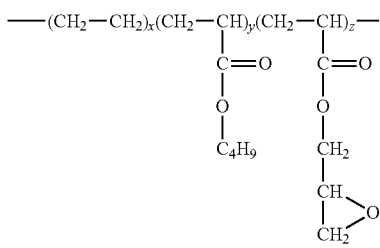

wherein, x, y, and z are 1 or greater.

The relative portion of the monomeric component(s) may be selected to achieve a balance between epoxy-reactivity and melt flow rate. More particularly, high epoxy monomer contents can result in good reactivity with the matrix polymer, but too high of a content may reduce the melt flow rate to such an extent that the copolymer adversely impacts the melt strength of the polymer blend. Thus, in most embodiments, the epoxy-functional (meth)acrylic monomer(s) constitute from about 1 wt. % to about 20 wt. %, in some embodiments from about 2 wt. % to about 15 wt. %, and in some embodiments, from about 3 wt. % to about 10 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. The result melt flow rate is typically from about 1 to about 30 grams per 10 minutes ("g/10 min"), in some embodiments from about 2 to about 20 g/10 min, and in some embodiments, from about 3 to about 15 g/10 min, as determined in accordance with ASTM D1238-13 at a load of 2.16 kg and temperature of 190° C.

One example of a suitable epoxy-functionalized copolymer that may be used in the present invention is commercially available from Arkema under the name LOTADER® AX8840. LOTADER® AX8840, for instance, has a melt flow rate of 5 g/10 min and is a random copolymer of ethylene and a glycidyl methacrylate (monomer content of 8 wt. %). Another suitable copolymer is commercially available from DuPont under the name ELVALOY® PTW, which is a terpolymer of ethylene, butyl acrylate, and glycidyl methacrylate and has a melt flow rate of 12 g/10 min and a glycidyl methacrylate monomer content of 4 wt. % to 5 wt. %.

C. Inorganic Fibers

Inorganic fibers typically constitute from about 1 wt. % to about 50 wt. %, in some embodiments from about 2 wt. % to about 40 wt. %, and in some embodiments, from about 5 wt. % to about 30 wt. % of the polymer composition. Any of a variety of different types of inorganic fibers may generally be employed, such as those that are derived from glass; silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Glass fibers are particularly suitable for use in the present invention, such as those formed from E-glass, A-glass, C-glass, D-glass, AR-glass, R-glass, S1-glass, S2-glass, etc., as well as mixtures thereof. If desired, the glass fibers may be provided with a sizing agent or other coating as is known in the art.

The inorganic fibers may have any desired cross-sectional shape, such as circular, flat, etc. In certain embodiments, it may be desirable to employ fibers having a relatively flat cross-sectional dimension in that they have an aspect ratio (i.e., cross-sectional width divided by cross-sectional thickness) of from about 1.5 to about 10, in some embodiments from about 2 to about 8, and in some embodiments, from about 3 to about 5. When such flat fibers are employed in a certain concentration, they may further improve the mechanical properties of the molded part without having a substantial adverse impact on the melt viscosity of the polymer composition. The inorganic fibers may, for example, have a nominal width of from about 1 to about 50 micrometers, in some embodiments from about 5 to about 50 micrometers, and in some embodiments, from about 10 to about 35 micrometers. The fibers may also have a nominal thickness of from about 0.5 to about 30 micrometers, in some embodiments from about 1 to about 20 micrometers, and in some embodiments, from about 3 to about 15 micrometers. Further, the inorganic fibers may have a narrow size distribution. That is, at least about 60% by volume of the fibers, in some embodiments at least about 70% by volume of the fibers, and in some embodiments, at least about 80% by volume of the fibers may have a width and/or thickness within the ranges noted above. In the molded part, the volume average length of the glass fibers may be from about 10 to about 500 micrometers, in some embodiments from about 100 to about 400 micrometers, and in some embodiments, from about 150 to about 350 micrometers.

D. Organosilane Compound

The polymer composition of the present invention also contains an organosilane compound. Such organosilane compounds typically constitute from about 0.01 wt. % to about 3 wt. %, in some embodiments from about 0.02 wt. % to about 1 wt. %, and in some embodiments, from about 0.05 to about 0.5 wt. % of the polymer composition. The organosilane compound may, for example, be any alkoxysilane as is known in the art, such as vinlyalkoxysilanes, epoxyalkoxysilanes, am inoalkoxysilanes, mercaptoalkoxysilanes, and combinations thereof. In one embodiment, for instance, the organosilane compound may have the following general formula:

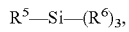

wherein,

R$^5$ is a sulfide group (e.g., —SH), an alkyl sulfide containing from 1 to 10 carbon atoms (e.g., mercaptopropyl, mercaptoethyl, mercaptobutyl, etc.), alkenyl sulfide containing from 2 to 10 carbon atoms, alkynyl sulfide containing from 2 to 10 carbon atoms, amino group (e.g., NH$_2$), aminoalkyl containing from 1 to 10 carbon atoms (e.g., aminomethyl, aminoethyl, aminopropyl, aminobutyl, etc.); aminoalkenyl containing from 2 to 10 carbon atoms, aminoalkynyl containing from 2 to 10 carbon atoms, and so forth;

R$^6$ is an alkoxy group of from 1 to 10 carbon atoms, such as methoxy, ethoxy, propoxy, and so forth.

Some representative examples of organosilane compounds that may be included in the mixture include mercaptopropyl trimethyoxysilane, mercaptopropyl triethoxysilane, aminopropyl triethoxysilane, aminoethyl triethoxysilane, aminopropyl trimethoxysilane, aminoethyl trimethoxysilane, ethylene trimethoxysilane, ethylene triethoxysilane, ethyne trimethoxysilane, ethyne triethoxysilane, aminoethylaminopropyltrimethoxysilane, 3-aminopropyl triethoxysilane, 3-aminopropyl trimethoxysilane, 3-aminopropyl methyl dimethoxysilane or 3-aminopropyl methyl diethoxysilane, N-(2-aminoethyl)-3-aminopropyl trimethoxysilane, N-methyl-3-aminopropyl trimethoxysilane, N-phenyl-3-aminopropyl trimethoxysilane, bis(3-aminopropyl) tetramethoxysilane, bis(3-aminopropyl) tetraethoxy disiloxane, γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane, γ-diallylaminopropyltrimethoxysilane, etc., as well as combinations thereof. Particularly suitable organosilane compounds are 3-aminopropyltriethoxysilane and 3-mercaptopropyltrimethoxysilane.

E. High Molecular Weight Siloxane Polymer

As indicated above, a siloxane polymer is also employed in the polymer composition. Without intending to be limited by theory, it is believed that the siloxane polymer can, among other things, improve the processing of the composition, such as by providing better mold filling, internal lubrication, mold release, etc. Further, due to its high molecular weight, it is also believed that the siloxane polymer is less likely to migrate or diffuse to the surface of the composition, which further minimizes the likelihood of phase separation and further assists in dampening impact energy. For instance, such siloxane polymers typically have a weight average molecular weight of about 100,000 grams per mole or more, in some embodiments about 200,000 grams per mole or more, and in some embodiments, from about 500,000 grams per mole to about 2,000,000 grams per mole. The siloxane polymer may also have a relative high kinematic viscosity, such as about 10,000 centistokes or more, in some embodiments about 30,000 centistokes or more, and in some embodiments, from about 50,000 to about 500,000 centistokes.

Any of a variety of high molecular weight siloxane polymers may generally be employed in the polymer composition. In certain embodiments, for example, the siloxane polymer may be an "MQ" resin, which is a macromolecular polymer formed primarily from R$_3$SiO$_{1/2}$ and SiO$_{4/2}$ units (the M and Q units, respectively), wherein R is a functional or nonfunctional organic group. Suitable organofunctional groups ("R") may include, for instance, alkyl (e.g., methyl, ethyl, propyl, butyl, etc.), aryl (e.g., phenyl), cycloalkyl (e.g., cyclopentyl), arylenyl, alkenyl, cycloalkenyl (e.g., cyclohexenyl), alkoxy (e.g., methoxy), etc., as well as combinations thereof. Such resins are generally prepared by chemically linking (copolymerizing) MQ resin molecules having a low weight average molecular weight (such as less than 100,000 grams per mole) with polysiloxane linkers. In one particular embodiment, for instance, the resin may be formed by copolymerizing a low molecular weight MQ solid resin (A) with a substantially linear polydiorganosiloxane linker (B), such as described in U.S. Pat. No. 6,072,012 to Juen, et al. The resin (A) may, for instance, have M and Q siloxy units having the following general formula:

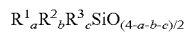

wherein,

R$^1$ is a hydroxyl group;

R$^2$ is a monovalent hydrocarbon group having at least one unsaturated carbon-carbon bond (i.e., vinyl) that is capable of addition reaction with a silicon-bonded hydrogen atom;

each R$^3$ is independently selected from the group consisting of alkyl, aryl and arylalkyl groups;

a is a number from 0 to 1, and in some embodiments, from 0 to 0.2;

b is number from 0 to 3, and in some embodiments, from 0 to 1.5; and c is a number greater than or equal to 0.

The substantially linear polydiorganosiloxane linker (B) may likewise have the following general formula:

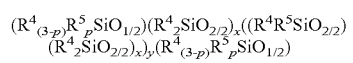

wherein,
each $R^4$ is a monovalent group independently selected from the group consisting of alkyl, aryl, and arylalkyl groups;
each $R^5$ is a monovalent group independently selected from the group consisting of hydrogen, hydroxyl, alkoxy, oximo, alkyloximo, and aryloximo groups, wherein at least two $R^5$ groups are typically present in each molecule and bonded to different silicon atoms;
p is 0, 1, 2, or 3;
x ranges from 0 to 200, and in some embodiments, from 0 to 100; and
y ranges from 0 to 200, and in some embodiments, from 0 to 100.

The high molecular siloxane polymers typically constitute from about 0.05 wt. % to about 5 wt. %, in some embodiments from about 0.1 wt. % to about 3 wt. %, and in some embodiments, from about 0.5 to about 2 wt. % of the polymer composition.

In certain embodiments, the siloxane polymer may be provided in the form of a masterbatch that includes a carrier resin. The carrier resin may, for instance, constitute from about 0.05 wt. % to about 5 wt. %, in some embodiments from about 0.1 wt. % to about 3 wt. %, and in some embodiments, from about 0.5 to about 2 wt. % of the polymer composition. Any of a variety of carrier resins may be employed, such as polyolefins (ethylene polymer, propylene polymers, etc.), polyamides, etc. In one embodiment, for example, the carrier resin is an ethylene polymer. The ethylene polymer may be a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %. The density of the ethylene polymer may vary depending on the type of polymer employed, but generally ranges from about 0.85 to about 0.96 grams per cubic centimeter (g/cm³). Polyethylene "plastomers", for instance, may have a density in the range of from about 0.85 to about 0.91 g/cm³. Likewise, "linear low density polyethylene" (LLDPE) may have a density in the range of from about 0.91 to about 0.940 g/cm³; "low density polyethylene" (LDPE) may have a density in the range of from about 0.910 to about 0.940 g/cm³; and "high density polyethylene" (HDPE) may have density in the range of from about 0.940 to about 0.960 g/cm³, such as determined in accordance with ASTM D792. Some non-limiting examples of high molecular weight siloxane polymer masterbatches that may be employed include, for instance, those available from Dow Corning under the trade designations MB50-001, MB50-002, MB50-313, MB50-314 and MB50-321.

F. Other Components

In addition to a polyarylene sulfide, impact modifier, inorganic fibers, organosilane compound, and high molecular weight siloxane polymer, the polymer composition may also contain a variety of other different components to help improve its overall properties. Particulate fillers may, for instance, be employed in the polymer composition. When employed, particulate fillers typically constitute from about 5 wt. % to about 60 wt. %, in some embodiments from about 10 wt. % to about 50 wt. %, and in some embodiments, from about 15 wt. % to about 45 wt. % of the polymer composition. Various types of particulate fillers may be employed as is known in the art. Clay minerals, for instance, may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K$, $H_3O$)($Al,Mg,Fe$)$_2$($Si,Al$)$_4O_{10}$ [$(OH)_2$,$(H_2O)$]), montmorillonite (($Na,Ca$)$_{0.33}$($Al$, $Mg$)$_2Si_4O_{10}(OH)_2 \cdot nH_2O$), vermiculite (($MgFe,Al$)$_3$ ($Al,Si$)$_4O_{10}(OH)_2 \cdot 4H_2O$), palygorskite (($Mg,Al$)$_2Si_4O_{10}$ $(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be a particularly suitable mineral for use in the present invention. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3$ $(AlSi_3)O_{10}(OH)_2$), lepidolite ($K(Li,Al)_2$-$3(AlSi_3)O_{10}$ $(OH)_2$), glauconite ($K,Na)(Al,Mg,Fe)_2(Si,Al)_4O_{10}(OH)_2$), etc., as well as combinations thereof.

A disulfide compound may also be employed in certain embodiments that can undergo a chain scission reaction with the polyarylene sulfide during melt processing to lower its overall melt viscosity. When employed, disulfide compounds typically constitute from about 0.01 wt. % to about 3 wt. %, in some embodiments from about 0.02 wt. % to about 1 wt. %, and in some embodiments, from about 0.05 to about 0.5 wt. % of the polymer composition. The ratio of the amount of the polyarylene sulfide to the amount of the disulfide compound may likewise be from about 1000:1 to about 10:1, from about 500:1 to about 20:1, or from about 400:1 to about 30:1. Suitable disulfide compounds are typically those having the following formula:

$$R^3\text{—}S\text{—}S\text{—}R^4$$

wherein $R^3$ and $R^4$ may be the same or different and are hydrocarbon groups that independently include from 1 to about 20 carbons. For instance, $R^3$ and $R^4$ may be an alkyl, cycloalkyl, aryl, or heterocyclic group. In certain embodiments, $R^3$ and $R^4$ are generally nonreactive functionalities, such as phenyl, naphthyl, ethyl, methyl, propyl, etc. Examples of such compounds include diphenyl disulfide, naphthyl disulfide, dimethyl disulfide, diethyl disulfide, and dipropyl disulfide. $R^3$ and $R^4$ may also include reactive functionality at terminal end(s) of the disulfide compound. For example, at least one of $R^3$ and $R^4$ may include a terminal carboxyl group, hydroxyl group, a substituted or non-substituted amino group, a nitro group, or the like.

Examples of compounds may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid (or 2,2'-dithiobenzoic acid), dithioglycolic acid, α,α'-dithiodilactic acid, β,β'-dithiodilactic acid, 3,3'-dithiodipyridine, 4,4'-dithiomorpholine, 2,2'-dithiobis(benzothiazole), 2,2'-dithiobis(benzimidazole), 2,2'-dithiobis(benzoxazole), 2-(4'-morpholinodithio)benzothiazole, etc., as well as mixtures thereof.

If desired, a nucleating agent may also be employed to further enhance the crystallization properties of the composition. One example of such a nucleating agent is an inorganic crystalline compound, such as boron-containing compounds (e.g., boron nitride, sodium tetraborate, potassium tetraborate, calcium tetraborate, etc.), alkaline earth metal carbonates (e.g., calcium magnesium carbonate), oxides (e.g., titanium oxide, aluminum oxide, magnesium oxide, zinc oxide, antimony trioxide, etc.), silicates (e.g., talc, sodium-aluminum silicate, calcium silicate, magnesium silicate, etc.), salts of alkaline earth metals (e.g., calcium carbonate, calcium sulfate, etc.), and so forth. Boron nitride (BN) has been found to be particularly beneficial when employed in the polymer composition of the present invention. Boron nitride exists in a variety of different crystalline forms (e.g., h-BN—hexagonal, c-BN—cubic or spharlerite, and w-BN—wurtzite), any of which can generally be employed in the present invention. The hexagonal crystalline form is particularly suitable due to its stability and softness.

If desired, other polymers may also be employed in the polymer composition for use in combination with the polyarylene sulfide. When employed, such additional polymers typically constitute from about 0.1 wt. % to about 30 wt. %, in some embodiments from about 0.5 wt. % to about 20 wt. %, and in some embodiments, from about 1 wt. % to about 10 wt. % of the polymer composition. Any of a variety of polymers may be employed, such as polyimides, polyamides, polyetherimides, polyarylene ether ketones, polyesters, etc. In one particular embodiment, a liquid crystalline polymer may be employed. The term "liquid crystalline polymer" generally refers to a polymer that can possess a rod-like structure that allows it to exhibit liquid crystalline behavior in its molten state (e.g., thermotropic nematic state). The polymer may contain aromatic units (e.g., aromatic polyesters, aromatic polyesteramides, etc.) so that it is wholly aromatic (e.g., containing only aromatic units) or partially aromatic (e.g., containing aromatic units and other units, such as cycloaliphatic units). Liquid crystalline polymers are generally classified as "thermotropic" to the extent that they can possess a rod-like structure and exhibit a crystalline behavior in their molten state (e.g., thermotropic nematic state). Because thermotropic liquid crystalline polymers form an ordered phase in the melt state, they can have a relatively low shear viscosity and thus sometimes act as a flow aid for the polyarylene sulfide. The liquid crystalline polymer may also help in further improving certain mechanical properties of the polymer composition.

The liquid crystalline polymers may be formed from one or more types of repeating units as is known in the art. The liquid crystalline polymers may, for example, contain one or more aromatic ester repeating units, typically in an amount of from about 60 mol. % to about 99.9 mol. %, in some embodiments from about 70 mol. % to about 99.5 mol. %, and in some embodiments, from about 80 mol. % to about 99 mol. % of the polymer. Examples of aromatic ester repeating units that are suitable for use in the present invention may include, for instance, aromatic dicarboxylic repeating units, aromatic hydroxycarboxylic repeating units, as well as various combinations thereof.

Still other components that can be included in the composition may include, for instance, antimicrobials, pigments (e.g., black pigments, inorganic pigments), lubricants, antioxidants, stabilizers, surfactants, waxes, flow promoters, solid solvents, flame retardants, and other materials added to enhance properties and processability.

II. Melt Processing

The manner in which the polyarylene sulfide, inorganic fibers, organosilane compound, impact modifier, high molecular weight siloxane polymer, and other optional additives are combined may vary as is known in the art. For instance, the materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the components may be fed to the same or different feeding ports of a twin-screw extruder and melt blended to form a substantially homogeneous melted mixture. Melt blending may occur under high shear/pressure and heat to ensure sufficient dispersion. For example, melt processing may occur at a temperature of from about 50° C. to about 500° C., and in some embodiments, from about 100° C. to about 250° C. Likewise, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

If desired, one or more distributive and/or dispersive mixing elements may be employed within the mixing section of the melt processing unit. Suitable distributive mixers may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further increased in aggressiveness by using pins in the barrel that create a folding and reorientation of the polymer melt, such as those used in Buss Kneader extruders, Cavity Transfer mixers, and Vortex Intermeshing Pin mixers. The speed of the screw can also be controlled to improve the characteristics of the composition. For instance the screw speed can be about 400 rpm or less, in one embodiment, such as between about 200 rpm and about 350 rpm, or between about 225 rpm and about 325 rpm. In one embodiment, the compounding conditions can be balanced so as to provide a polymer composition that exhibits improved impact and tensile properties. For example, the compounding conditions can include a screw design to provide mild, medium, or aggressive screw conditions. For example, system can have a mildly aggressive screw design in which the screw has one single melting section on the downstream half of the screw aimed towards gentle melting and distributive melt homogenization. A medium aggressive screw design can have a stronger melting section upstream from the filler feed barrel focused more on stronger dispersive elements to achieve uniform melting. Additionally it can have another gentle mixing section downstream to mix the fillers. This section, although weaker, can still add to the shear intensity of the screw to make it stronger overall than the mildly aggressive design. A highly aggressive screw design can have the strongest shear intensity of the three. The main melting section can be composed of a long array of highly dispersive kneading blocks. The downstream mixing section can utilize a mix of distributive and intensive dispersive elements to achieve uniform dispersion of all type of fillers. The shear intensity of the highly aggressive screw design can be significantly higher than the other two designs. In one embodiment, a system can include a medium to aggressive screw design with relatively mild screw speeds (e.g., between about 200 rpm and about 300 rpm).

Regardless of the manner in which they are combined together, the present inventors have discovered that the polymer composition may possess a relatively low melt viscosity, which allows it to readily flow during production of the part. For instance, the composition may have a melt viscosity of about 5,000 poise or less, in some embodiments about 2,500 poise or less, in some embodiments about 2,000 poise or less, and in some embodiments, from about 50 to about 1,000 poise, as determined by a capillary rheometer at a temperature of about 310° C. and shear rate of 1200 seconds$^{-1}$. Among other things, these viscosity properties can allow the composition to be readily shaped into parts having a small dimension.

Due to the relatively low melt viscosity that can be achieved in the present invention, relatively high molecular weight polyarylene sulfides can also be fed to the extruder with little difficulty. For example, such high molecular weight polyarylene sulfides may have a number average molecular weight of about 14,000 grams per mole ("g/mol") or more, in some embodiments about 15,000 g/mol or more, and in some embodiments, from about 16,000 g/mol to about 60,000 g/mol, as well as weight average molecular weight of about 35,000 g/mol or more, in some embodiments about 50,000 g/mol or more, and in some embodiments, from about 60,000 g/mol to about 90,000 g/mol, as determined using gel permeation chromatography as described below. One benefit of using such high molecular weight polymers is that they generally have a low chlorine content. In this regard, the resulting polymer composition may have a low chlorine content, such as about 1200 ppm or less, in some embodiments about 900 ppm or less, in some embodiments from 0 to about 800 ppm, and in some embodiments, from about 1 to about 500 ppm.

In addition, the crystallization temperature (prior to being formed into a shaped part) of the polymer composition may about 250° C. or less, in some embodiments from about 100° C. to about 245° C., and in some embodiments, from about 150° C. to about 240° C. The melting temperature of the polymer composition may also range from about 250° C. to about 320° C., and in some embodiments, from about 260° C. to about 300° C. The melting and crystallization temperatures may be determined as is well known in the art using differential scanning calorimetry in accordance with ISO Test No. 11357:2007. Even at such melting temperatures, the ratio of the deflection temperature under load ("DTUL"), a measure of short term heat resistance, to the melting temperature may still remain relatively high. For example, the ratio may range from about 0.65 to about 1.00, in some embodiments from about 0.70 to about 0.99, and in some embodiments, from about 0.80 to about 0.98. The specific DTUL values may, for instance, range from about 200° C. to about 300° C., in some embodiments from about 210° C. to about 290° C., and in some embodiments, from about 220° C. to about 280° C. Such high DTUL values can, among other things, allow the use of high speed processes often employed during the manufacture of components having a small dimensional tolerance.

The resulting composition (and shaped parts formed therefrom) has also been found to possess excellent mechanical properties. For example, the present inventors have discovered that the impact strength of the part can be significantly improved by the use of the functionalized coupling system of the present invention, which is useful when forming small parts. The part may, for instance, possess a Charpy notched impact strength of about 5 kJ/m$^2$ or more, in some embodiments from about 7 to about 40 kJ/m$^2$, and in some embodiments, from about 8 to about 30 kJ/m$^2$, measured at 23° C. according to ISO Test No. 179-1:2010 (technically equivalent to ASTM D256-12, Method B). Despite having a low melt viscosity and high impact strength, the present inventors have also discovered that the tensile and flexural mechanical properties are not adversely impacted. For example, the molded part may exhibit a tensile strength of from about 20 to about 500 MPa, in some embodiments from about 50 to about 400 MPa, and in some embodiments, from about 100 to about 350 MPa; a tensile break strain of about 0.5% or more, in some embodiments from about 0.6% to about 10%, and in some embodiments, from about 0.8% to about 3.5%; and/or a tensile modulus of from about 3,000 MPa to about 30,000 MPa, in some embodiments from about 4,000 MPa to about 25,000 MPa, and in some embodiments, from about 5,000 MPa to about 22,000 MPa. The tensile properties may be determined in accordance with ISO Test No. 527:2012 (technically equivalent to ASTM D638-14) at 23° C. The part may also exhibit a flexural strength of from about 20 to about 500 MPa, in some embodiments from about 50 to about 400 MPa, and in some embodiments, from about 100 to about 350 MPa; a flexural break strain of about 0.5% or more, in some embodiments from about 0.6% to about 10%, and in some embodiments, from about 0.8% to about 3.5%; and/or a flexural modulus of from about 3,000 MPa to about 30,000 MPa, in some embodiments from about 4,000 MPa to about 25,000 MPa, and in some embodiments, from about 5,000 MPa to about 22,000 MPa. The flexural properties may be determined in accordance with ISO Test No. 178:2010 (technically equivalent to ASTM D790-10) at 23° C.

Additionally, the color of a polyarylene sulfide composition (and shaped parts formed therefrom) may be changed without altering the concentration of any colorants or other additives. For instance, this may be achieved by employing a treated polyarylene sulfide in combination with an untreated polyarylene sulfide. The color measurements can be quantified by measuring the absorbance with an optical reader in accordance with a standard test methodology known as "CIELAB", which is described in Pocket Guide to Digital Printing by F. Cost, Delmar Publishers, Albany, N.Y. ISBN 0-8273-7592-1 at pages 144 and 145 and "Photoelectric color difference meter", Journal of Optical Society of America, volume 48, page numbers 985-995, S. Hunter, (1958), both of which are incorporated herein by reference in their entirety. More specifically, the CIELAB test method defines three "Hunter" scale values, L*, a*, and b*, which correspond to three characteristics of a perceived color based on the opponent theory of color perception and are defined as follows: L=Lightness (or luminosity), ranging from 0 to 100, where 0=dark and 100=light; a*=Red/green axis, ranging from −100 to 100; positive values are reddish and negative values are greenish; and b*=Yellow/blue axis, ranging from −100 to 100; positive values are yellowish and negative values are bluish. The chromaticity can then be determined to provide an indication of the quality of the color.

III. Shaped Parts

The polymer composition may be employed in a wide variety of different types of shaped parts using various techniques. In certain embodiments, for instance, a shaped part may be formed by a molding technique, such as injection molding, compression molding, nanomolding, overmolding, blow molding, etc. For example, as is known in the art, injection molding can occur in two main phases— i.e., an injection phase and holding phase. During the injection phase, the mold cavity is completely filled with the molten polymer composition. The holding phase is initiated after completion of the injection phase in which the holding pressure is controlled to pack additional material into the cavity and compensate for volumetric shrinkage that occurs during cooling. After the shot has built, it can then be cooled. Once cooling is complete, the molding cycle is completed when the mold opens and the part is ejected, such as with the assistance of ejector pins within the mold.

Various devices may employ a molded part that contains the polymer composition of the present invention. For example, the polymer composition may be used in components such as bearings, electrical sensors, coils (e.g., pencil, ignition, etc.), clamps (e.g., hose clamps), valves, switches, printer parts, pumps (e.g., gear pumps, pump impellers, pump housings, etc.), dashboards, pipes, hoses (e.g., for vehicular exhaust systems), tubes, oil and gas flowlines (e.g., downhole centralizer). For example, in one embodiment, an elongated member may be formed that has a hollow interior to allow the passage of a fluid (e.g., oil, fuel, water, exhaust gases, etc.). The elongated member may have a variety of shapes, such as tubular or other complex shapes. The elongated member may extend in a single direction or in multiple directions so that it includes multiple angular displacements. In another embodiment, the elongated member may be a downhole centralizer, which contains bowed elements that are fitted with a hinged collar. As is known in the art, such centralizers are generally used to keep a casing or liner in the center of a wellbore to ensure efficient placement of a sheath (e.g., cement) around the casing string.

In yet another embodiment, the shaped part may be used to form an overmolded structure. This may be accomplished by "overmolding" the polymer composition onto a portion or the entire surface of the metal component so that it forms a resinous component that is adhered thereto. The metal component may contain any of a variety of different metals, such as aluminum, stainless steel, magnesium, nickel, chromium, copper, titanium, and alloys thereof. Magnesium-aluminum alloys are particularly suitable for use in the metal component. Such alloys typically contain from 0.5 wt. % to 15 wt. % aluminum and 85 wt. % to 99.5 wt. % magnesium. The metal component may be shaped using known techniques, such as casting, forging, etc., and may possess any desired shape or size depending on the intended use of the composite structure. The polymer composition generally adheres to the metal component during overmolding by flowing within and/or around surface indentations or pores of the metal component. To improve adhesion, the metal component may optionally be pretreated to increase the degree of surface indentations and surface area. This may be accomplished using mechanical techniques (e.g., sandblasting, grinding, flaring, punching, molding, etc.) and/or chemical techniques (e.g., etching, anodic oxidation, etc.). For instance, techniques for anodically oxidizing a metal surface are described in more detail in U.S. Pat. No. 7,989,079 to Lee, et al. In addition to pretreating the surface, the metal component may also be preheated at a temperature close to, but below the melt temperature of the polymer composition. This may be accomplished using a variety of techniques, such as contact heating, radiant gas heating, infrared heating, convection or forced convection air heating, induction heating, microwave heating or combinations thereof. In any event, the polymer composition is generally injected into a mold that contains the optionally preheated metal component. Once formed into the desired shape, the composite structure is allowed to cool so that the resinous component becomes firmly adhered to the metal component.

Of course, other techniques for forming shaped parts may be employed. In one embodiment, for instance, the polymer composition may be melt extruded into a sheet that can be used to form a film, fiber, thermoformed article, etc. Suitable melt extrusion techniques may include, for instance, tubular trapped bubble film processes, flat or tube cast film processes, slit die flat cast film processes, etc. Referring to FIG. 1, for instance, one embodiment of a melt extrusion process is shown in more detail. As illustrated, the components of the polymer composition may be initially fed to an extruder 110 that heats the composition to a temperature sufficient for it to flow. In one embodiment, the polymer composition is heated to a temperature that is at the melting temperature of the polymer composition or within a range of about 20° C. above or below the melting temperature of the polymer composition. The extruder 110 produces a precursor sheet 112. Before having a chance to solidify, the precursor sheet 112 may optionally be fed into a nip of a calendering device 114 to form a polymeric sheet have a more uniform thickness. The calendering device 114 may include, for instance, a pair of calendering rolls that form the nip. Once calendered, the resulting polymeric sheet may optionally be cut into individual sheets 118 using a cutting device 116.

The resulting melt-extruded sheet may, in certain embodiments, be used in a thermoforming process by heating it to a certain temperature so that it becomes flowable, shaping the sheet within a mold, and then optionally trimming the shaped article to create the desired article. For example, a sheet may be clamped inside a thermoformer and heated (e.g., with infrared heaters) to a temperature at or near the melting temperature of the polymer matrix, such as to a temperature of about 250° C. or more, in some embodiments about 270° C. or more, and in some embodiments, from about 280° C. to about 350° C. Depending on the type of machine used, the sheet may be transferred to a forming station or the bottom heating elements may be moved for the forming tool to be able to form the sheet. If desired, the sheet may also be dried before thermoforming to help remove moisture from the composition. For instance, drying may occur at a temperature of from about 60° C. to about 200° C., and in some embodiments, from about 100° C. to about 160° C. Different thermoforming techniques can be successfully used, such as vacuum forming, plug-assist vacuum forming, pressure forming, reverse draw, twin sheet thermoforming and others. Once the forming step is completed, the part can be trimmed.

Referring to FIG. 2, for example, one particular embodiment of a thermoforming process is shown in more detail. As illustrated, the polymeric sheet 118 is first fed to a heating device 120 that heats it to a temperature sufficient to cause the polymer to deform or stretch. In general, any suitable heating device may be used, such as a convection oven, electrical resistance heater, infrared heater, etc. Once heated, the polymeric sheet 118 is fed to a molding device 122 where it is molded into an article. Any of a variety of molding devices may be employed in the thermoforming process, such as a vacuum mold (e.g., porous mold). Regardless, a force (e.g., suction force) is typically placed against the sheet to cause it to conform to the contours of the mold. At the contours, for instance, the draw ratio may be greater than 1:1 to about 5:1. Molding of the polymeric sheet 118 typically occurs before the sheet substantially solidifies and/or crystallizes. Thus, the properties of the polymer are not only important during production of the polymeric sheets 118, but are also important during the subsequent molding process. If the polymeric sheet 118 were to solidify and/or crystallize too quickly, the polymer may tear, rupture, blister or otherwise form defects in the final article during molding.

Regardless of the process employed, the melt-extruded composition may be shaped into a variety sizes, and it may be used in a wide range of different applications. For example, due to its unique combination of thermal stability, chemical resistance, and good mechanical properties, the melt-extruded composition may be useful as a replacement for metals or coated metals used as a thermal or chemical shield. Examples of such applications include, for instance, heat exchangers (e.g., flue gas heat exchangers), automotive parts, appliances (e.g., ovens or microwaves), construction equipment, railways, package, container, tray (e.g., for a food article or in electronic applications), reactors, hydrogen generators, electronic parts (e.g., housings, connectors, circuit boards etc.), cookware, bakeware, etc. Typical uses of the article in such applications include, for instance, as a housing, shield, frame, cover, etc.

In one embodiment, for instance, a food tray 2 may be formed in part or entirely from the melt-extruded polymer composition of the present invention. In the illustrated embodiment, for instance, the food tray 2 is generally rectangular in shape and contains a sidewall 6 that extends upwardly from a lower wall of the tray 2 to define a receptacle 5 for one or more food products. The sidewall and/or bottom wall may be formed from the polymer composition of the present invention. A flange 10, which can be formed from the polymer composition of the present invention, also protrudes from the sidewall 6 and extends around the perimeter of the tray 2. If desired, a lid (not shown) may cover the tray 2 so that it is positioned adjacent to an upper surface 11 of the flange 10. If desired, the lid may also be formed from the polymer composition of the present invention.

The present invention may be better understood with reference to the following examples.

Test Methods

Melt Viscosity:

The melt viscosity (Pa-s) may be determined in accordance with ISO Test No. 11443:2005 at a shear rate of 1200 s$^{-1}$ and using a Dynisco LCR7001 capillary rheometer. The rheometer orifice (die) may have a diameter of 1 mm, length of 20 mm, L/D ratio of 20.1, and an entrance angle of 180°. The diameter of the barrel may be 9.55 mm+0.005 mm and the length of the rod was 233.4 mm. The melt viscosity is typically determined at a temperature at least 15° C. above the melting temperature, such as 316° C.

Melting Temperature:

The melting temperature ("Tm") may be determined by differential scanning calorimetry ("DSC") as is known in the art. For semi-crystalline and crystalline materials, the melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Deflection Temperature Under Load ("DTUL"):

The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation at Break:

Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 5 mm/min.

Flexural Modulus, Flexural Stress, and Flexural Break Strain:

Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Notched Charpy Impact Strength:

Notched Charpy properties may be tested according to ISO Test No. ISO 179-1:2010) (technically equivalent to ASTM D256-10, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C.

Chlorine Content:

Chlorine content may be determined according to an elemental analysis using Parr Bomb combustion followed by Ion Chromatography.

Color Measurements:

Color measurements were performed using a DataColor 650 Spectrophotometer utilizing an integrating sphere with measurements made using the specular included mode. Color coordinates can likewise be calculated according to ASTM D2244-11 under an illuminant D65/10°, A/10°, or F2/10° observer, using CIELAB units (L*, a*, b*). Also reported is the C* value (chromaticity) calculated by the following equation: $C^*=(a^{*2}+B^{*2})^{1/2}$ wherein, a* is the red/green axis value of the color of the specimen and b* is the yellow/blue axis value of the color of the specimen.

Example 1

The components listed in Table 1 below are mixed in a Werner Pfleiderer ZSK 25 co-rotating intermeshing twin-screw extruder with a 25 mm diameter.

TABLE 1

| Ingredient | Wt. % |
|---|---|
| MB50-314 (Dow Corning) | 2.0 |
| 910A-10C Glass Fibers (Owens Corning) | 15.0 |
| Aminosilane | 0.2 |
| Lotader ® AX 8840 | 7.5 |
| Fortron ® 0214 | 75.3 |

The pellets are also injection molded on a Mannesmann Demag D100 NCIII injection molding machine and tested for certain physical characteristics, as provided in Table 2 below.

TABLE 2

| Property | Value |
|---|---|
| Melt Viscosity (Pa-s) | 517.2 |
| Tensile Modulus (MPa) | 5,910 |
| Tensile Stress (MPa) | 104.51 |
| Tensile Break Elongation (%) | 2.47 |
| Charpy Notched Impact Strength (kJ/m$^2$) | 10.3 |
| DTUL (° C.) | 228 |

Example 2

The components listed in Table 3 below are mixed in a Werner Pfleiderer ZSK 25 co-rotating intermeshing twin-screw extruder with a 25 mm diameter.

TABLE 3

| Sample | A-1 | A-2 | A-3 | A-4 | A-5 |
|---|---|---|---|---|---|
| Fortron ® 0214 | 91.15 | 68.36 | 45.575 | 22.79 | — |
| Ryton ® PR25 | — | 22.79 | 45.575 | 68.36 | 91.15 |
| Lotader ® AX 8840 | 7.5 | 7.5 | 7.5 | 7.5 | 7.5 |
| Glycolube ® P | 0.3 | 0.3 | 0.3 | 0.3 | 0.3 |
| Colorants (Inorganic pigments) | 1.05 | 1.05 | 1.05 | 1.05 | 1.05 |

The pellets were then molded into plaques in order to obtain the color measurements, which are summarized in Table 4 below.

TABLE 4

| Sample | A-1 | A-2 | A-3 | A-4 | A-5 |
|---|---|---|---|---|---|
| L* | 79.23 | 71.05 | 64.56 | 57.32 | 50.12 |
| a* | 4.7 | 5.09 | 5.47 | 5.09 | 4.93 |
| b* | 26.36 | 20.22 | 17.73 | 14.28 | 12.35 |
| C* | 26.78 | 20.85 | 18.55 | 15.16 | 13.36 |

As demonstrated by the data, in particular the chromaticity values, a color change can be achieved by altering the ratio of PPS 1 and PPS 3 (treated PPS) without the need to adjust the concentration of the colorants or any other additives.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising a polyarylene sulfide, inorganic fibers, an impact modifier, an organosilane compound, and a siloxane polymer having a weight average molecular weight of about 10,000 grams per mole or more.

2. The polymer composition of claim 1, wherein the siloxane polymer constitutes from about 0.05 wt. % to about 5 wt. % of the polymer composition.

3. The polymer composition of claim 1, wherein the inorganic fibers constitute from about 1 wt. % to about 50 wt. % of the polymer composition, the impact modifier constitutes from about 1 wt. % to about 40 wt. % of the polymer composition, the organosilane compound constitutes from about 0.02 wt. % to about 4 wt. % of the polymer composition, and/or the polyarylene sulfide constitutes from about 25 wt. % to about 95 wt. % of the polymer composition.

4. The polymer composition of claim 1, wherein the polyarylene sulfide is a linear polyphenylene sulfide.

5. The polymer composition of claim 1 wherein the impact modifier includes an epoxy-functionalized olefin copolymer.

6. The polymer composition of claim 5, wherein the epoxy-functionalized olefin copolymer contains an ethylene monomeric unit.

7. The polymer composition of claim 5, wherein the epoxy-functionalized olefin copolymer contains an epoxy-functional (meth)acrylic monomeric component.

8. The polymer composition of claim 7, wherein the epoxy-functional (meth)acrylic monomeric component is derived from glycidyl acrylate, glycidyl methacrylate, or a combination thereof.

9. The polymer composition of claim 7, wherein the epoxy-functional (meth)acrylic monomeric unit constitutes from about 1 wt. % to about 20 wt. % of the copolymer.

10. The polymer composition of claim 1, wherein the organosilane compound has the following general formula:

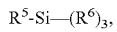

$$R^5\text{-Si}-(R^6)_3,$$

wherein,

R$^5$ is a sulfide group, an alkyl sulfide containing from 1 to 10 carbon atoms, alkenyl sulfide containing from 2 to 10 carbon atoms, alkynyl sulfide containing from 2 to 10 carbon atoms, amino group, aminoalkyl containing from 1 to 10 carbon atoms, aminoalkenyl containing from 2 to 10 carbon atoms, aminoalkynyl containing from 2 to 10 carbon atoms, or a combination thereof; and R$^6$ is an alkoxy group of from 1 to 10 carbon atoms.

11. The polymer composition of claim 1, wherein the organosilane compound includes 3-aminopropyltriethoxysilane, 3-mercaptopropyltrimethoxysilane, or a combination thereof.

12. The polymer composition of claim 1, wherein the inorganic fibers include glass fibers.

13. The polymer composition of claim 1, wherein the siloxane polymer has a kinematic viscosity of about 10,000 centistokes or more.

14. The polymer composition of claim 1, wherein the siloxane polymer contains R$_3$SiO$_{1/2}$ and SiO$_{4/2}$ units, wherein R is a functional or nonfunctional organic group.

15. The polymer composition of claim 1, further comprising an ethylene/α-olefin polymer in an amount of from 0.05 wt. % to about 5 wt. % of the polymer composition.

16. The polymer composition of claim 1, wherein the composition has a melt viscosity of about 5,000 poise or less as determined in accordance with ISO Test No. 11443:2005 at a shear rate of 1200 s$^{-1}$ and at a temperature of 316° C.

17. A molded part comprising the polymer composition of claim 1.

18. The molded part of claim 17, wherein the part has a notched Charpy impact strength of about 5 kJ/m² or more, measured at a temperature of 23° C. according to ISO Test No. 179-1:2010.

19. A melt-extruded sheet comprising the polymer composition of claim 1.

20. A food tray comprising the polymer composition of claim 1.

21. The food tray of claim 20, wherein the tray contains a sidewall that extends upwardly from a lower wall to define a receptacle for one or more food products, wherein the sidewall, lower wall, or a combination thereof contain the polymer composition.

22. An overmolded structure comprising the polymer composition of claim 1 and a metal component.

\* \* \* \* \*